Patented Mar. 30, 1943

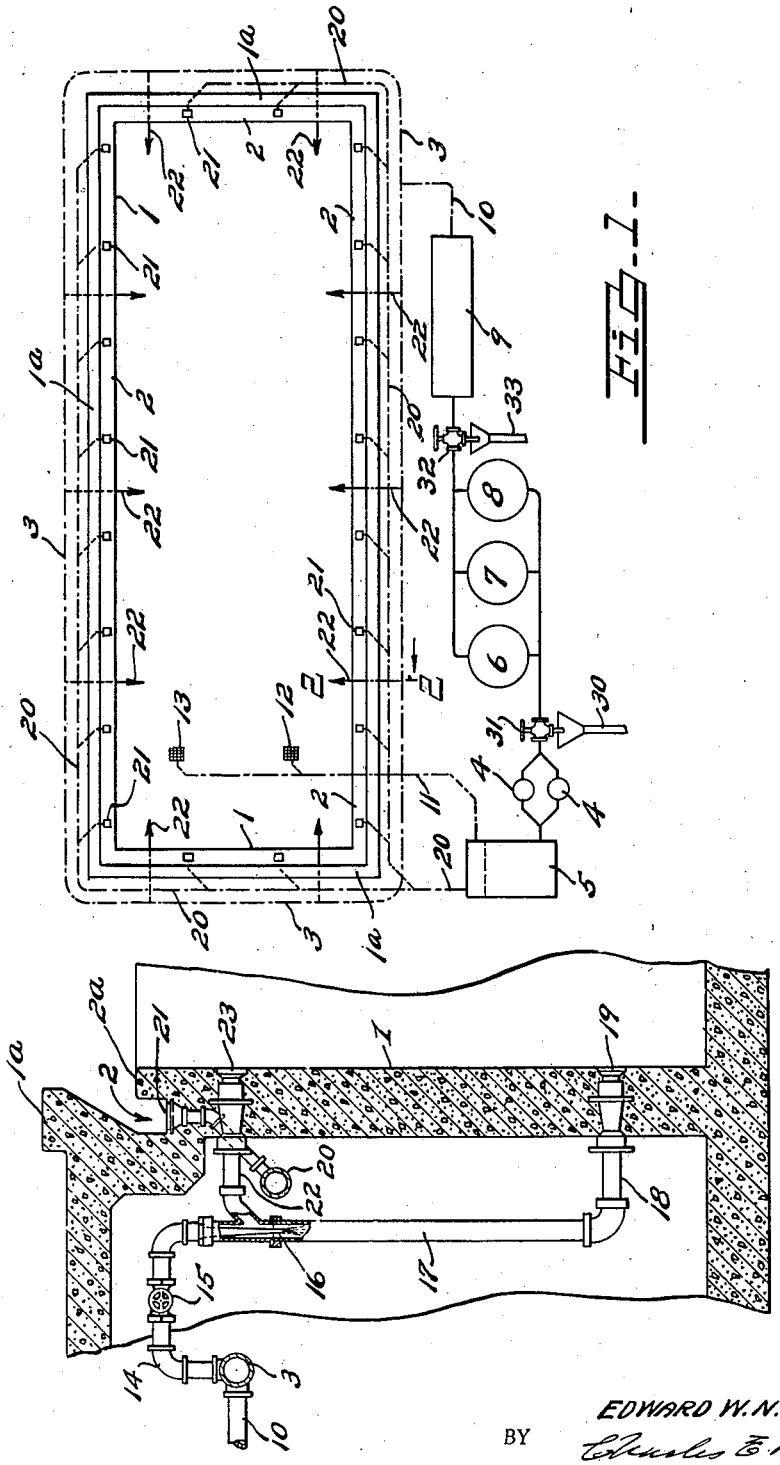

2,315,184

UNITED STATES PATENT OFFICE 2,315,184

MEANS FOR AND METHOD OF MAINTAINING THE WATER OF SWIMMING POOLS AT SUBSTANTIALLY UNIFORM TEMPERATURE

Edward W. N. Boosey, Detroit, Mich.

Application October 7, 1941, Serial No. 414,008

5 Claims. (Cl. 210—11)

This invention relates to swimming pools particularly to a means for and method of maintaining the water of a swimming pool at a substantially uniform temperature throughout its mass and involves the automatic withdrawal of the water adjacent the upper surface of normally higher temperature than that nearer the bottom and injecting the same into a stream of heater water discharging into the pool at a multiplicity of points substantially equally spaced about the pool adjacent the bottom to rise through the body of the water in the pool to the surface in order to prevent cold areas in the body of water. The apparatus further provides for maintenance of a uniform chlorination of the water in the pool and functions to prevent portions of the body of water having too great a chlorine content due to the fact that the apparatus is so arranged that there is a uniform circulation of the water in the pool and, within practical limits, no "dead" spots wherein the temperature and the chlorine content differ materially from that of any other portion of the body of the water.

These and other objects and novel features of the invention are hereinafter more fully described and claimed and apparatus embodying my invention is shown in its preferred form in the accompanying drawing in which—

Fig. 1 is a diagrammatic view in plan of a swimming pool with which my improved water-recirculating means is shown.

Fig. 2 is an enlarged vertical section taken on line 2—2 of Fig. 1 showing the preferred means for recirculation of the water in the pool and by which the heated water adjacent the surface of the water in the pool is injected into the heated supply water discharging into the water adjacent the bottom of the pool.

It has heretofore been known to discharge water into swimming pools at various points and to purify the water, one such character of apparatus being shown in U. S. patent to Frank E. Hartman, No. 1,563,851 of December 1, 1925, in which the heated water is discharged into the bottom of the pool and is withdrawn from the top of the pool and thence through the filtering, heating, and purifying instrumentalities to the bottom.

My improved apparatus differs from such structure or similar structures known to me as will be more fully understood from the following description.

The swimming pool is formed of the usual peripheral wall 1 terminating at the top of the rim 1a and is formed with a scum gutter 2 therebelow. The pool is usually filled with water to approximately the level of the gutter rim 2a below the main rim 1a of the pool and forming the inner wall of the scum gutter and into which gutter the surface water is caused to flow usually by activity of the bathers in the pool. The gutter is provided with a series of outlets 21 leading to a drain pipe 20 connected with the surge tank 5 as shown in Fig. 2.

The heated supply water conduit is indicated at 3 in Figs. 1 and 2 and water is supplied to the conduit 3 by means of pumps indicated at 4 which withdraw water from the surge tank 5 and passes the water supplied to the surge tank through the filters 6, 7 and 8 and thence to the heater 9 which discharges to the conduit 10 and thence to the hot water conduit 3. The surge tank has an intake conduit 11 leading to openings 12 and 13 in the bottom of the pool preferably at the point of greatest depth.

The principal structural feature of the invention, and by which my improved method of recirculating the water in the pool is attained, is shown more clearly in Fig. 2 in which the heated water conduit 3 is provided with a series of outlet conduits 14 having control valves 15 therein terminating in a downwardly directed nozzle 16 in a vertical pipe 17 which discharges to adjacent the bottom of the tank by the conduit 18 opening through the inner wall 19. With each of the vertical pipes 17 is connected a conduit 22 opening at 23 to the interior of the tank below the surface of the liquid. This conduit 22 opens to the conduit 17 above the end of the nozzle 16 and the parts for an injector whereby flow of water under pressure through the nozzle 16 causes withdrawal of water through the conduit 22 to mix with the freshly heated water discharging through the nozzles 16 and passing therewith to the bottom of the tank through the outlets 19. There are several of these conduits 22 about the pool as shown in Fig. 1 and, by the described arrangement of parts, water of the highest temperature within the pool is withdrawn therefrom into the heated supply water and the heat is thus conserved.

This arrangement is of importance in that it serves to prevent material variation in the character of the surface water from the temperature of the water therebelow. In other words it prevents stratification of hot and cold water in the pool and, by reason of the distribution of the outlets 19 about the walls of the pool, the heated water discharged thereinto from the outlets is caused to spread out laterally and to rise through the body of the water in the pool to the surface. This arrangement, therefore, tends to prevent material variation in temperature in the body of the water within the pool.

The injection of the water from the top of the pool into the highly heated water supplied by the conduit 10 to the nozzles 16 also tends to prevent stratification of the water in the pool. The pool is originally filled with water from a desired source, as a water main, and may be replenished from such source, not here shown, to maintain the desired water level within the pool. During use of the pool the water is continuously withdrawn from the pool adjacent the surface and discharged to the bottom of the pool with additional water that may be supplied from the hot water conduit 3 and cold water is also withdrawn from the bottom of the pool during normal operation through outlets 12 and 13 located at the deepest point in the pool.

The water originally supplied to the pool is usually treated with chlorine or other satisfactory chemical to prevent the injurious effect of impurities in the water and may be provided in any convenient manner. The water discharged to the pool from the heater is withdrawn through the outlets 12 and 13 and from the scum gutter by reduced pressure in the surge tank by the pumps and then passed through the filters and to the heater.

The arrangement of parts shown thus serve to constantly re-circulate the water in the pool and when it is desired to change the water in the pool the water may be withdrawn from the pool through the surge tank and discharged to an outlet 30 in the conduit between the pump and the filters, the discharge being controlled by a valve 31 which provides for discharge from the pump to the filters, through the heater to the pool or to the conduit 30. In cleaning the sand bed in the filters, the valve 32 is opened to permit discharge to a waste conduit 33.

The apparatus is of simple and inexpensive construction not materially varying the cost from that of known apparatus although differing structurally therefrom. By the method involved the hottest water of the pool is withdrawn therefrom to prevent an accumulation of hot water at the upper part of the pool and, by arranging the outlets 19 to discharge under pressure into the pool at the bottom at substantially equally spaced points toward the center of the pool, the rising heated water from these multiple points of supply is effective to prevent unduly cold spots at any point in the body of the water, in other words, substantially uniform temperature is attained while, with devices previously known to me, both stratification of water of different temperatures and also "cold spots" undesirable to bathers occurs.

The water is also maintained in a high state of purity by reason of the injection of the water of less purity at the top of the pool into the hotter water discharging to the pool through the outlets 19. Also by the arrangement of parts as described the water is maintained comparatively uniform in chemical content there being no pockets or dead spots wherein chlorine or other chemicals may accumulate to an undesirable degree.

Having thus fully described my invention, its utility and mode of operation, what I claim and desire to secure by Letters Patent of the United States is—

1. The method of re-circulating the water in a swimming pool which consists in discharging streams of heated water into the pool at a series of spaced points about the lower part thereof and by influence of the discharging streams automatically injecting heated water from the upper portion of the water in the pool into the streams of heated water discharging into the lower part of the pool.

2. The method of maintaining the water of a swimming pool at substantially uniform temperature throughout its body, which consists in discharging heated water into the body of water in the pool at approximately the bottom thereof and simultaneously causing a flow of water from adjacent the surface of the water in the pool into the heated water prior to discharge to the bottom of the pool to thereby maintain the water in the pool at substantially uniform temperature from top to bottom.

3. The method of maintaining the water in a swimming pool at substantially uniform temperature throughout its body, which consists in discharging streams of heated water into the pool at a multiplicity of points adjacent the pool bottom and to thence pass upwardly through the body of the water in the pool to the surface, and simultaneously injecting heated water rising to the surface of the water in the pool into each of the streams discharging to the bottom of the pool to thereby maintain the body of water in the pool at approximately uniform temperature from top to bottom.

4. Apparatus for maintaining the water of a swimming pool, having a peripheral wall, at substantially uniform temperature throughout its body, comprising the association with the pool of a series of vertical conduits positioned horizontally in spaced relation exteriorly of the wall thereof, each of said vertical conduits having an opening to the interior of the pool adjacent the top and an opening adjacent the bottom thereof, an inlet conduit for heated water opening to the upper end of each of said vertical conduits, a nozzle within the vertical portion of each of the vertical conduits directing flow downward therein, a pump by means of which the heated water is discharged downwardly in the vertical conduits and thence into the lower part of the pool, the arrangement providing an injector through influence of which water is induced to flow from the body of water in the upper part of the pool into the vertical conduits to mix with the heated water therein prior to discharge into the bottom of the body of water in the pool.

5. Apparatus for maintaining the water of a swimming pool at substantially uniform temperature and purity throughout its body, comprising the association with the peripheral wall of the pool, of a series of vertical conduits positioned about the pool in horizontally spaced relation, each of said vertical conduits having an opening to the interior of the pool adjacent the top and an opening thereinto adjacent the bottom thereof, an inlet conduit, a water heater and a filtering means in the said inlet conduit, the portion of the inlet conduit leading from the heater being connected to discharge to the upper end of each of the vertical conduits, a nozzle within the upper end of the vertical portion of the vertical conduits positioned to discharge the heated water downwardly therein and thence into the pool through the bottom opening, the arrangement providing an injector through influence of which water is induced to flow from the body of the water in the upper part of the pool into the vertical conduits to mix with the heated water therein prior to discharge thereof into the lower part of the body of water in the pool, and means for withdrawing water from the pool and to discharge the same through the filter, the heater and said inlet conduit in succession under pressure.

EDWARD W. N. BOOSEY.